Patented Jan. 12, 1954

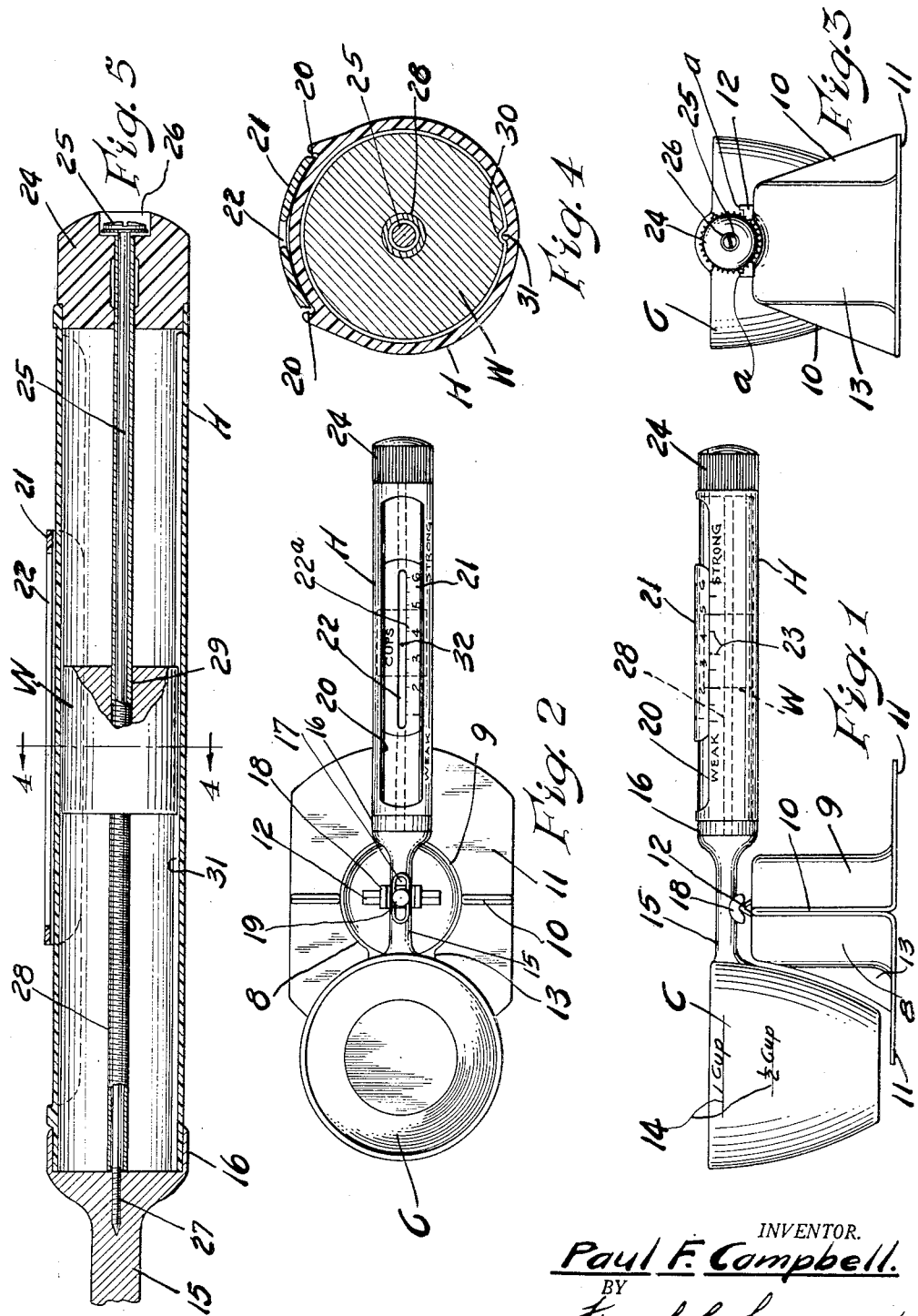

2,665,898

UNITED STATES PATENT OFFICE 2,665,898

COFFEE WEIGHING DEVICE

Paul F. Campbell, Saginaw, Mich.

Application July 20, 1950, Serial No. 174,930

12 Claims. (Cl. 265—49)

This invention relates to coffee weighing devices by means of which coffee can be easily, quickly and accurately weighed so that a predetermined volume of liquid may be added to provide coffee of desired strength.

Another object is to design a very compact and inexpensive device which can be readily adjusted and/or set to weigh sufficient coffee to which water may be added to provide a predetermined volume of the brewed coffee and of a certain strength.

A further object is to design a neat-appearing, streamlined, combination weighing and measuring device which can be economically manufactured and assembled, and which is of neat and pleasing appearance.

A further object still is to provide a simple and convenient device which can be set to properly weight the coffee, so that a constant strength or flavor can be maintained so long as the device remains set and the same volume of water is added, said device being capable of easy adjustment to provide for either a stronger or a milder brew of coffee if desired.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a side elevational view showing my new coffee weighing and water measuring device.

Fig. 2 is a top, plan view thereof.

Fig. 3 is an end elevational view.

Fig. 4 is an enlarged, transverse sectional view taken on the line 4—4 of Fig. 5.

Fig. 5 is an enlarged, longitudinal, sectional view through the handle.

Referring now more specifically to the drawing in which I have shown the preferred embodiment of my invention, the numeral 8 indicates the supporting base, preferably made up of stamped sheet metal section 8 and 9 respectively, flanged as at 10 and secured together by welding or in any other approved manner, each section being formed with a base 11 to provide proper bearing and having a raised, knife-like rib 12 forming a fulcrum on the upper face of the structure, all as clearly shown in Figs. 1 and 2 of the drawing.

The front section 8 is formed with an inclined, outwardly pressed rib or section 13, which rib is curved to conform to the curvature of the measuring cup C, and serves as a rest for said cup after the coffee has been poured therein, thus preventing excessive tilting of the cup and associated parts.

The cup C can be formed of any desired material and is suitably graduated as at 14 so that it can be used for measuring water as well as weighing the bulk coffee (not shown) when desired, this cup being formed with a laterally projecting stem 15, the ferrule section 16 of which is enlarged and tubular in shape to accommodate one end of the handle H, as will be hereinafter described.

An elongated, slotted opening 17 is provided in the stem 15 at a point intermediate its length, and a transversely disposed, grooved plate 18 spans the lower end of said opening, said plate being adjustable on the stem and is held in position by means of a screw 19 which extends through opening 17 and has threaded engagement with the plate 18 to secure it in adjusted position, and the end sections of the fulcrum can be raised as at "a" if desired to prevent endwise displacement of the cup thereon.

The handle H is preferably tubular in shape and is formed of transparent plastic, having spaced-apart, elongated ribs 20 molded or otherwise formed on the outer periphery of the handle to accommodate a sliding scale 21, said scale having a centrally disposed, elongated, slotted opening 22 therein, the one end of which is calibrated as at 22ª and the edge of one of said ribs is also calibrated as at 23 and for a purpose to be presently described.

A knob member 24 is piloted on the end of the handle H, and the head of a screw 25 is accommodated in a recess 26 provided in said knob, the opposite threaded end of the screw engaging a threaded opening 27 provided in the stem 15.

A threaded sleeve 28 is revolvably mounted on the screw 25, the end being molded in the knob 24 for rotation therewith, said sleeve extending through a threaded opening 29 provided in a longitudinally adjustable weight member W which is adjustably mounted in said handle, said weight being formed with a longitudinally disposed groove 30, slidably engaging with a longitudinally disposed rib 31 formed in said handle, so that the weight can be longitudinally adjusted as the knob is rotated.

An indicating dot 32 is provided in the face of the weight and indicates the position of said weight with relation to certain calibrations as the adjustment is being made. For example, rotation of the knob 24 in a clockwise or counterclockwise direction shifts the weight towards or away from the cup, thus requiring either more or less coffee to balance, so that by adding the weighed coffee to a predetermined volume or number of cups of water, a predetermined volume of brew of certain strength may be had.

The device is designed so that a person may secure brewed coffee of desired strength at all times. If a stronger brew is desired, the sliding scale 21 is moved towards "strong" and the weight W is then set to conform to the number of cups of coffee desired to be brewed. If, upon test, the brew is found satisfactory, and with the setting undisturbed, ground coffee (not shown) is poured into the cup C until it is balanced on the fulcrum 12; this quantity of coffee is then poured into a coffee maker, perculator or vacuum device (not shown), the cup C being utilized to measure the proper volume of water (after weighing the coffee), to conform to the reading on the scale.

When, by trial, the strength of brew and flavor to suit the person's taste is found, the sliding scale remains stationary; it needs no further adjusting unless the brew strength is changed to correspond to a different brand of coffee, or to suit some other individual. A recorded note may be kept of the setting and can, of course, be duplicated at a moment's notice.

It will be understood that the device may be used for weighing any dry substance to be mixed or dissolved in any liquid, and the proportions may be varied as desired.

It will be obvious that the procedure of making coffee can be followed in reverse when desired, i. e., ground coffee can be poured into the cup and then the weight adjusted to balance. Then, by reading the position of the indicating dot, the user can determine the necessary volume of water to add to the weighed quantity of coffee. This method is especially useful when the last of the coffee is being used from the package, as just the right amount of water can be indicated for the remaining coffee on hand. Further, should it be desired to make but one cup, or any other small quantity, the strength remains as constant as for the larger quantities.

From the foregoing, it will be obvious that I have perfected a very simple, practical and inexpensive coffee weighing device.

What I claim is:

1. A measuring device of the character described comprising, a supporting stand, a measuring cup including a stem and hollow handle tiltably mounted on said stand, said hollow handle having a scale calibrated thereon, a weight longitudinally adjustable in said handle, a second scale mounted on said handle and slidable longitudinally thereon with relation to said weight, and means on said stand for limiting the downward tilt of said measuring cup.

2. The combination defined in claim 8 in which a knob is piloted on one end of said handle, a threaded sleeve secured in said knob and having threaded engagement with said weight, and means for preventing rotation of said weight with relation to said handle when the knob is actuated to longitudinally adjust said weight.

3. The combination set forth in claim 8 in which tilt limiting means is provided comprising a forwardly and upwardly projecting raised rib provided on the stand, the face of the rib being of the same curvature as the side wall of said measuring cup.

4. The combination defined in claim 8 in which the stand comprises two stamped members, each being provided with raised, knife-like ribs on one of their top edges, said ribs forming a fulcrum when the sections are secured together, and a grooved plate adjustably mounted on the cup stem for engagement by said fulcrum to provide for accurate balancing of the cup structure thereon.

5. The combination set forth in claim 8 in which a longitudinally extending rib is provided in the handle, and a complementary groove is provided in the weight to prevent rotation of the weight when the knob is rotated to longitudinally adjust said weight in said handle.

6. In a beverage measuring device for measuring the amount of concentrate to be added to a quantity of liquid, a supporting stand, fulcrum means on said stand, a cup including a handle fulcrumed on said means, a scale indicating relative brew strength calibrated on said handle, a second scale calibrated in standard unit quantities of brew to be made slidable on said handle and adjustable with relation to the first mentioned scale and a weight slidable relative to said handle, and said second scale having marker means to associate with the calibrations on said second scale and thus determine the amount of concentrate to be placed in said cup to achieve a balance.

7. In a beverage measuring device for measuring the amount of concentrate to be added to a quantity of liquid, a cup including a handle, means for tiltably supporting said cup interjacent its ends, a scale indicating relative brew strength calibrated on said handle, a second scale calibrated in standard unit quantities of brew to be made slidable on said handle and adjustable with relation to the first mentioned scale and a weight slidable relative to said handle and said second scale having marker means to associate with the calibrations on said second scale and thus determine the amount of concentrate to be placed in said cup to achieve a balance.

8. In a beverage measuring device for measuring the amount of concentrate to be added to a given quantity of liquid, an upright stand, fulcrum means on said stand, a measuring cup including a stem and hollow handle tiltably mounted on said stand, said handle having an opening therein, a scale indicating relative brew strength longitudinally calibrated on an edge of said opening, a second scale calibrated in standard unit quantities of brew to be made longitudinally slidable in said opening and adjustable with relation to the first mentioned scale, and a weight longitudinally slidable in said hollow handle having marker means to associate with the calibrations on said second scale and thus determine the amount of concentrate to be placed in said cup to achieve a balance.

9. In a measuring device, a standard comprising a pair of mating sections, each provided with a raised, knife-like rib along an upper side edge thereof to form a fulcrum when said sections are secured together, a measuring cup including a stem and hollow handle, said stem having a longitudinally disposed opening therethrough, a grooved saddle plate for said stem adapted to support said cup on said fulcrum, said plate being longitudinally adjustable within the limits of said opening, said handle having a longitudinally disposed, slotted opening therein, a scale calibrated on an edge of said opening, elongated rib guides provided on the longitudinal edges of said slotted opening, a second scale slidably mounted in said guides and adjustable with relation to said first-mentioned scale, a knob forming a closure for the outer end of said handle, a pin mounted in said knob and anchored in said stem, a threaded sleeve mounted on said pin and secured to said knob, a weight threaded on said sleeve within said handle and adjustable longitudinally within said handle when said knob is rotated, said second scale having a longitudinally disposed, slotted opening, a marker on said weight visible through said slotted opening in said second scale to associate with said second scale and thus determine the amount of a substance to be placed in said cup to achieve a balance, a longitudinally extending rib in said handle, and a complementary groove in the weight to prevent rotation thereof when the knob is rotated to longitudinally adjust said weight.

10. The combination defined in claim 9 in which said first-mentioned scale is calibrated in units representing relative decoction of coffee grounds, and said second scale is calibrated in standard unit quantities of beverage to be made.

11. A measuring device comprising a stand having a raised fulcrum on the upper face thereof, a measuring cup mounted on said fulcrum of said stand and including a stem and hollow handle, said hollow handle being provided with a slotted opening, an edge of which is calibrated, a longitudinally adjustable grooved plate on said stem to permit said cup to removably rest on said fulcrum, a knob forming a closure for one end of said hollow handle, a screw mounted on said knob and anchored in said stem, a threaded sleeve mounted on said screw and secured to said knob, elongated guides provided on the periphery of the handle, a scale slidably mounted in said guides and adjustable with relation to the calibrated edge of said openings, a weight on said sleeve within said handle and adjustable longitudinally thereon when the knob is rotated to associate said weight with said scale.

12. A measuring device comprising a stand having a raised fulcrum on the upper face thereon, a measuring cup mounted on said fucrum of said stand and including a stem and hollow handle, said hollow handle being provided with a slotted opening, an edge of which is calibrated in units of relative brew strength, a longitudinally adjustable grooved plate on said stem to permit said cup to removably rest on said fulcrum, a knob forming a closure for one end of said hollow handle, a screw mounted in said knob and anchored in said stem, a threaded sleeve mounted on said screw and secured to said knob, elongated guides provided on the periphery of the handle, a scale calibrated in unit quantities of brew to be made slidably mounted in said guides, and adjustable with relation to the calibrated edge of said openings, a weight on said sleeve within said handle and adjustable longitudinally thereon when the knob is rotated to associate said weight with said scale.

PAUL F. CAMPBELL.

| Number | Name | Date |
|---|---|---|
| 183,156 | Grove | Oct. 10, 1876 |
| 1,180,277 | Attaway | Apr. 25, 1916 |
| 1,949,944 | Seedever | Mar. 6, 1934 |
| 2,097,753 | Bennett | Nov. 2, 1937 |
| 2,186,256 | McClain | Jan. 9, 1940 |
| 2,230,341 | Szasz | Feb. 4, 1941 |